United States Patent [19]

Fuse et al.

[11] Patent Number: 5,501,470
[45] Date of Patent: Mar. 26, 1996

[54] NON-CONTACTING SHAFT SEALING DEVICE WITH GROOVED FACE PATTERN

[75] Inventors: Toshihiko Fuse; Eiji Okumachi, both of Sanda, Japan

[73] Assignee: Nippon Pillar Packing Co., Ltd., Osaka, Japan

[21] Appl. No.: 160,195

[22] Filed: Dec. 2, 1993

[30] Foreign Application Priority Data

Dec. 11, 1992 [JP] Japan ............................ 4-331828
Jul. 22, 1993 [JP] Japan ............................ 5-181059

[51] Int. Cl.⁶ ........................................ F16J 15/34
[52] U.S. Cl. ........................................ 277/96.1
[58] Field of Search ............................ 277/81 R, 96, 277/96.1

[56] References Cited

U.S. PATENT DOCUMENTS

| | | | |
|---|---|---|---|
| 4,212,475 | 7/1980 | Sedy ........................................ | 277/96.1 |
| 5,066,026 | 11/1991 | Heck et al. ............................. | 277/96.1 |
| 5,222,743 | 1/1993 | Goldswain ............................. | 277/96.1 |
| 5,312,117 | 5/1994 | Takenaka et al. ...................... | 277/96.1 |

FOREIGN PATENT DOCUMENTS

| | | | |
|---|---|---|---|
| 275182 | 11/1990 | Japan ..................................... | 277/96.1 |
| 50559 | 2/1992 | Japan ..................................... | 277/96.1 |
| 272581 | 9/1992 | Japan ..................................... | 277/96.1 |
| 337165 | 11/1992 | Japan ..................................... | 277/96.1 |
| 337164 | 11/1992 | Japan ..................................... | 277/96.1 |

*Primary Examiner*—Scott W. Cummings
*Attorney, Agent, or Firm*—Griffin, Butler, Whisenhunt & Kurtossy

[57] ABSTRACT

In a non-contacting shaft sealing device of the type wherein a sealing end face of a case seal and a sealing end face of a rotary shaft seal rotate relative to each other in a non-contacting state while being separated by a film of fluid derived from the high pressure region being sealed, one sealing end face is provided with an even number of dynamic pressure generating groove groups arranged in the peripheral direction on the sealing end face. Each dynamic pressure generating groove group has plural approximately L-shaped linear dynamic pressure generating grooves each composed of a fluid lead-in part extending in the radial direction from the peripheral edge of the sealing end face so as to communicate with the high pressure region, and a dynamic pressure generating part extending in the peripheral direction from the end portion of the fluid lead-in part with the dynamic pressure generating grooves not crossing each other and being arranged in the radial direction. Two adjacent dynamic pressure generating groove groups are symmetrical around the diametral line of the sealing end face.

17 Claims, 14 Drawing Sheets

5,501,470

NON-CONTACTING SHAFT SEALING DEVICE WITH GROOVED FACE PATTERN

FIELD OF THE INVENTION

The present invention relates to a non-contacting shaft sealing device for use in rotary machines such as compressors, turbines and blowers. More specifically, the invention relates to an improved arrangement of the dynamic pressure generating grooves in shaft sealing devices of the type wherein fluid from a high pressure region being sealed is interposed between first and second sealing elements so that the seal elements do not contact each other as relative rotation between the seal elements takes place.

BACKGROUND OF THE INVENTION

Non-contacting shaft sealing devices are well known for providing a seal around a shaft where the shaft penetrates a case or housing, the sealing device serving to separate a region at one pressure on the interior of the case from a region at a different pressure on the exterior of the case. Typically, these devices include two seals in face-to-face relationship: a shaft seal mounted for rotation with the shaft and a case seal mounted on the case. Grooves are provided on the surface of the shaft seal, the grooves communicating with the fluid region being sealed and being designed to generate from the sealed fluid a dynamic pressure which acts against the surface of the case seal thereby tending to move the case seal away from the shaft seal. A spring acts against the case seal in opposition to the generated pressure and a balance is established such that during rotation of the shaft seal a thin fluid film maintains the surfaces of the seals in a non-contacting state.

FIG. 17 illustrates the configuration of grooves provided in the surface of one seal of the prior art for generating the dynamic pressure. Dynamic pressure generating grooves b are formed parallel to one another on a sealing end face or surface a of a shaft seal and extend helically in the peripheral direction of the seal in order to generate a dynamic pressure (positive pressure) between the sealing end face a and the sealing end face of the case seal (not shown). As one of the sealing end faces is rotated relative to the other, the back pressure due to the fluid to be sealed acting on the sealing end face of the case seal, and the spring force pressing this sealing end face toward the sealing end face a of the rotary shaft seal may be balanced, and the sealing end faces are held in a non-contacting state with a fluid film interposed between them.

The helical dynamic pressure generating grooves b generate a dynamic pressure only when the rotary shaft or the sealing end face a is rotated in the direction indicated by arrow A. A dynamic pressure is not generated between the shaft seal surface and the case seal surface when the surface a rotates in the reverse direction. Therefore, a seal having the groove configuration shown in FIG. 17 could not be used in rotary machines having a shaft which may rotate in both a forward and a reverse direction.

Furthermore, although plural dynamic pressure generating regions are arranged parallel in the peripheral direction, only one dynamic pressure generating groove b is present in each dynamic pressure generating region, that is, there is only one dynamic pressure generating spot in each dynamic pressure generating region. Therefore, if dust or dirt contained in the fluid to be sealed invades and is deposited in part of the dynamic pressure generating grooves b, the dynamic pressure generated in the entire dynamic pressure generating region including the clogged dynamic pressure generating groove b decreases. In such a case, therefore, the shaft sealing function may be lowered or fail.

BRIEF DESCRIPTION OF THE INVENTION

An object of the invention to provide a non-contacting shaft sealing device capable of generating a sufficient dynamic pressure between a shaft seal end face and a case seal end face for keeping the end faces in a non-contacting state regardless of the relative rotating direction of the end faces, i.e. whether the rotating direction of the rotary shaft is in a forward or a reverse direction, whereby the device exhibits a favorable sealing function not only in machines wherein a rotary shaft always rotates in one direction, but also in machines wherein a shaft may rotate in a forward or a reverse direction.

Another object of the invention to provide a non-contacting shaft sealing device which generates the dynamic pressure under the same conditions regardless of the rotating direction of the rotary shaft, and which is equal in its shaft sealing function whether the shaft rotates in a forward or a reverse direction.

It is another object of the invention to provide a non-contacting shaft sealing device having many dynamic pressure generating grooves i.e. dynamic pressure generating spots on the sealing end face by forming dynamic pressure generating grooves in linear shape and occupying an extremely small area, and capable of easily and securely obtaining a generated dynamic pressure sufficient to keep two sealing end faces in an appropriate non-contacting state.

A further object of the invention to provide a non-contacting shaft sealing device comprising a shaft seal and a case seal one seal having a sealing end face in which are formed multiple independent dynamic pressure generating grooves extending parallel to each other in the peripheral direction of the seal surface whereby the shaft sealing device is capable of always maintaining and keeping a favorable shaft sealing state, without release of pressure from the dynamic pressure generating grooves even if the radial configuration of both sealing end faces is changed, and having a large restoring strength if a sealing end face is inclined.

Yet another object of the invention to provide a non-contacting shaft sealing device wherein one seal end face has dynamic pressure generating grooves with adjacent grooves in the peripheral direction of the seal surface being symmetrical about a diametral line of the sealing surface whereby the device generates dynamic pressure under the same conditions regardless of the direction of rotation of the shaft, and which is equal in its shaft sealing function whether the shaft is rotating in a forward or a reverse direction.

Another object of the invention to provide a non-contacting shaft sealing device having multiple independent dynamic pressure generating grooves arranged in the peripheral direction and radial direction so that the device does not, on the whole, become extremely uneven in the peripheral direction in regard to the distribution of the generated dynamic pressure, and can prevent a lowered or abnormal shaft sealing function due to poor pressure distribution, even if the generated dynamic pressure is partly decreased due to invasion or deposit of dust or dirt contained in the fluid to be sealed in part of the dynamic pressure generating grooves.

The non-contacting shaft sealing device of the invention includes an even-number of sets of dynamic pressure generating groove groups arranged in the peripheral direction on the sealing end face of the case seal or the shaft seal. Each dynamic pressure generating groove group comprises plural approximately L-shaped linear dynamic pressure generating grooves each having a fluid lead-in part extending in the radial direction to the peripheral edge of the sealing end face so as to communicate with the high pressure region being sealed, and a dynamic pressure generating part joined at one end to the fluid lead-in part. Within each group, the dynamic pressure generating parts extend in the peripheral direction and are disposed parallel to each other in the direction of the radius of the seal surface, without crossing each other. Two adjacent dynamic pressure generating groove groups are symmetrical around a diametral line of the sealing end face.

When the sealing end face in which the dynamic pressure generating grooves are formed is rotated relatively, fluid from the high pressure region being sealed is led into the dynamic pressure generating grooves through the fluid lead-in parts, and generates a dynamic pressure (positive pressure) in the terminal end portions of the dynamic pressure generating parts extending in the rotating direction (the relative rotating direction with the opposite sealing end face) so that the sealing end faces are held in a non-contacting state with an interposed fluid film of the fluid from the high pressure region.

Since an even number of sets of dynamic pressure generating groove groups are arranged in the peripheral direction and adjacent dynamic pressure generating groove groups are symmetrical in the peripheral direction, the dynamic pressure generating grooves comprise a first type of dynamic pressure generating groove groups wherein the dynamic pressure generating parts extend from the fluid lead-in parts in the forward direction of rotation of the grooved sealing end face, and a second type of dynamic pressure generating groove groups wherein the dynamic pressure generating parts extend from the fluid lead-in parts in the opposite or reverse direction. The forms (the number, shape, length and configuration of the fluid lead-in parts and dynamic pressure generating parts) of the dynamic pressure generating grooves are exactly the same in both types of groups.

Therefore, when the grooved sealing end face is relatively rotated in the forward direction, a dynamic pressure is generated in the terminal end part of the dynamic pressure generating part of each dynamic pressure generating groove in the first group, and when the grooved sealing end face is relatively rotated in the reverse direction, a dynamic pressure is generated in the terminal end part of the dynamic pressure generating part of each dynamic pressure generating groove in the second group, and, as mentioned above, since the dynamic pressure generating grooves in the first and second groups are identical in number, shape, etc., the dynamic pressure is generated in the same conditions regardless of the direction of rotation so that an appropriate dynamic pressure is generated between the sealing end faces and a favorable shaft sealing function is obtained.

Moreover, since the dynamic pressure generating grooves have a linear shape occupying a very small area, the number of dynamic pressure generating grooves (especially the number of dynamic pressure generating parts arranged in a row in the radial direction) in each of the dynamic pressure generating groove groups can be greatly increased. Therefore, if dust or dirt contained in the fluid being sealed invades and deposits in part of the dynamic pressure generating grooves to decrease the dynamic pressure generated therein, the pressure distribution of the dynamic pressure generated in the peripheral direction does not become extremely non-uniform, and a lowering or abnormality of the shaft sealing function due to defective distribution of pressure does not occur since the dynamic pressure generating groves are independent. That is, since there are many independent dynamic pressure generating parts disposed parallel to each other in the radial direction in each of the dynamic pressure generating regions arranged in the peripheral direction, if the dynamic pressure generated in one or a few of the dynamic pressure generating grooves in one dynamic pressure generating region is decreased due to invasion and deposit of dust or dirt, there are still many other dynamic pressure generating grooves capable of generating appropriate dynamic pressure, hence the generated dynamic pressure in the whole dynamic pressure generating region is only slightly decreased and the pressure distribution in the peripheral direction does not become extremely non-uniform.

In one embodiment, the non-contacting shaft sealing device of the invention comprises plural dynamic pressure generating grooves arranged in the peripheral direction on one sealing end face, each dynamic pressure generating groove being in the shape of a shallow linear groove extending in the radial direction to a peripheral edge of the sealing end face in contact with the fluid in the high pressure region being sealed, and each groove having a zigzag form with two or more turning points. When one sealing end face is rotated relative to the other, a positive dynamic pressure is generated at the turning points in each dynamic pressure generating groove, that is, at the turning points at the rotating direction side, and the sealing end faces are held in a non-contacting state. Since each dynamic pressure generating groove is in a zigzag form having two or more turning points, whether the relative rotation of the sealing end faces is in the forward or reverse direction, there are always turning points at the rotating direction side where dynamic pressure is generated so that the sealing end faces are held in a non-contacting state.

Figure 1:
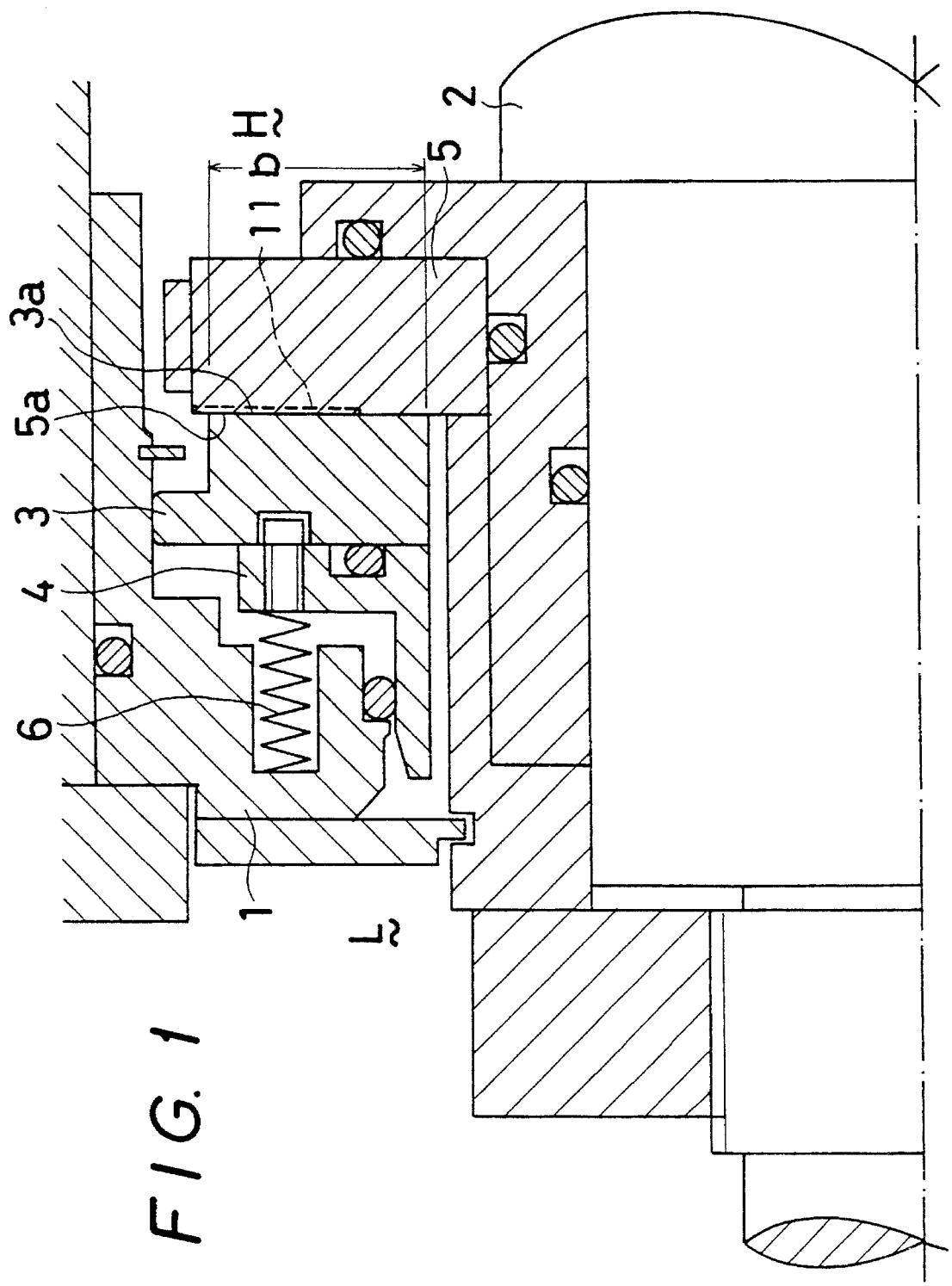
FIG. 1 is a cross sectional view showing a non-contacting shaft sealing device according to the invention.

dynamic pressure generating grooves $11_2$ by the high pressure side sealed fluid introduced into the second dynamic pressure generating grooves $11_2$, the grooves $11_2$ being equal in number to the grooves $11_1$ and having the same shape as the first dynamic pressure generating grooves $11_1$. Each dynamic pressure generating groove 11 is an independent linear groove occupying a very small area, and many dynamic pressure generating grooves $11_1$, $11_2$ can be formed on the sealing end face 5a, so that a sufficient dynamic pressure can be generated for holding the sealing end faces 3a, 5a in a non-contacting state. Moreover, since the first dynamic pressure generating grooves $11_1$ or second dynamic pressure generating grooves $11_2$ are formed in large numbers independently in the peripheral direction and radial direction, even if dust or dirt contained in the fluid to be sealed invades and deposits in part of the dynamic pressure generating grooves 11 to decrease the dynamic pressure generated in the dynamic pressure generating grooves 11, on the whole, the pressure distribution of the generated dynamic pressure in the peripheral direction will not be extremely non-uniform. Furthermore, whether the rotary shaft 2 is rotated in the forward or reverse direction, a dynamic pressure is generated between the sealing end faces 3a and 5a under the same conditions. This generated dynamic pressure, the back pressure acting on the stationary sealing ring 3 i.e. the pressure of the high pressure side sealed fluid acting on the back side of the holding ring 4 and the thrusting force by the spring 6 are balanced, and the two sealing end faces 3a and 5a are held in a non-contacting state by an interposing fluid film of the fluid from the high pressure region. At the area where the fluid film is formed, the high pressure side sealed fluid region H and low pressure side sealed fluid region L are separated and sealed.

The invention is not limited to the above mentioned embodiment alone, but may be properly changed or modified without departing from the true spirit and principle of the invention. In particular, the number and shape of the dynamic pressure generating groove groups 10 are arbitrary and may be changed, for example, as shown in FIGS. 4–10.

Figure 3:
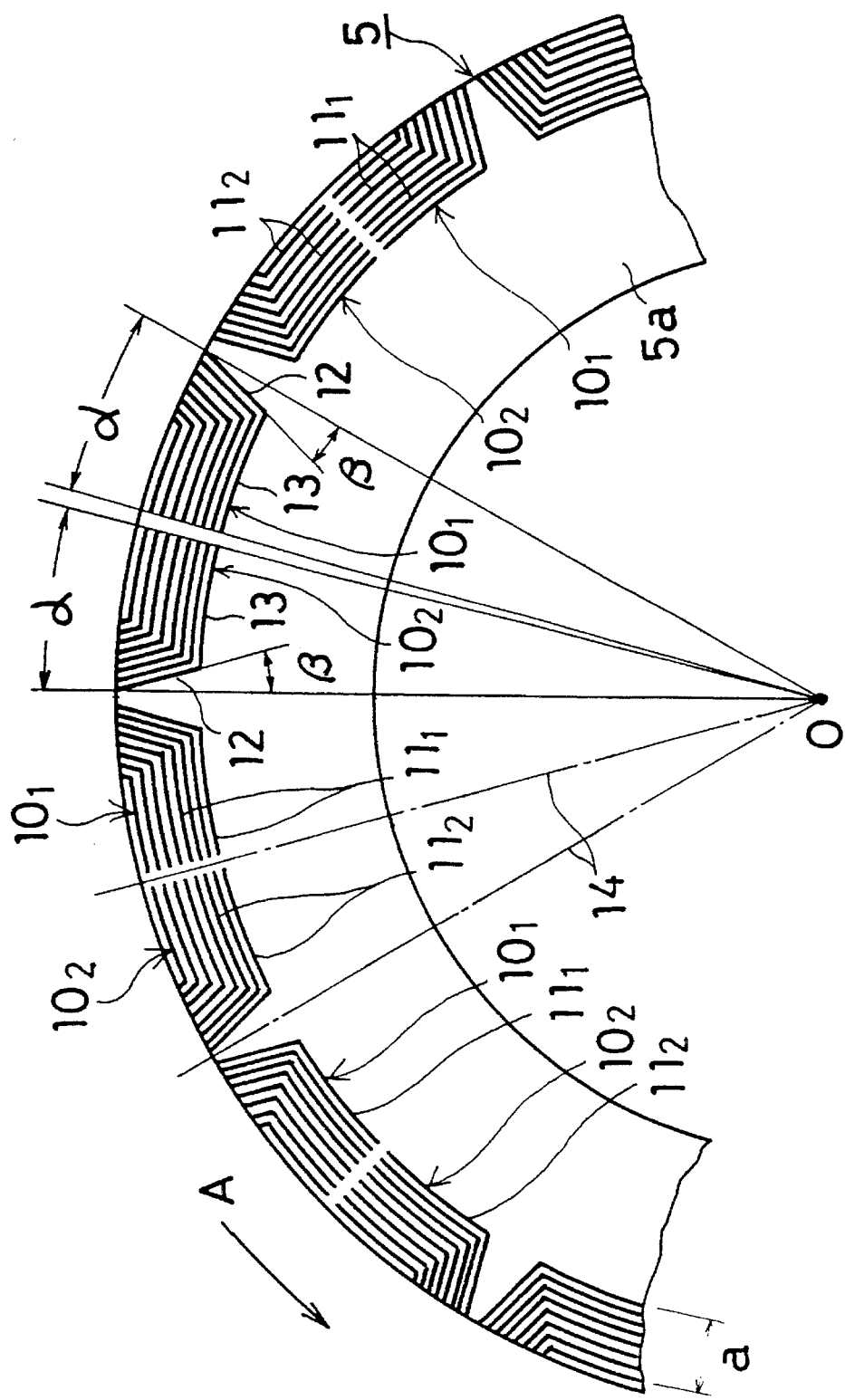
FIG. 3 is a magnified detailed view of part of FIG. 2.
Figure 4:
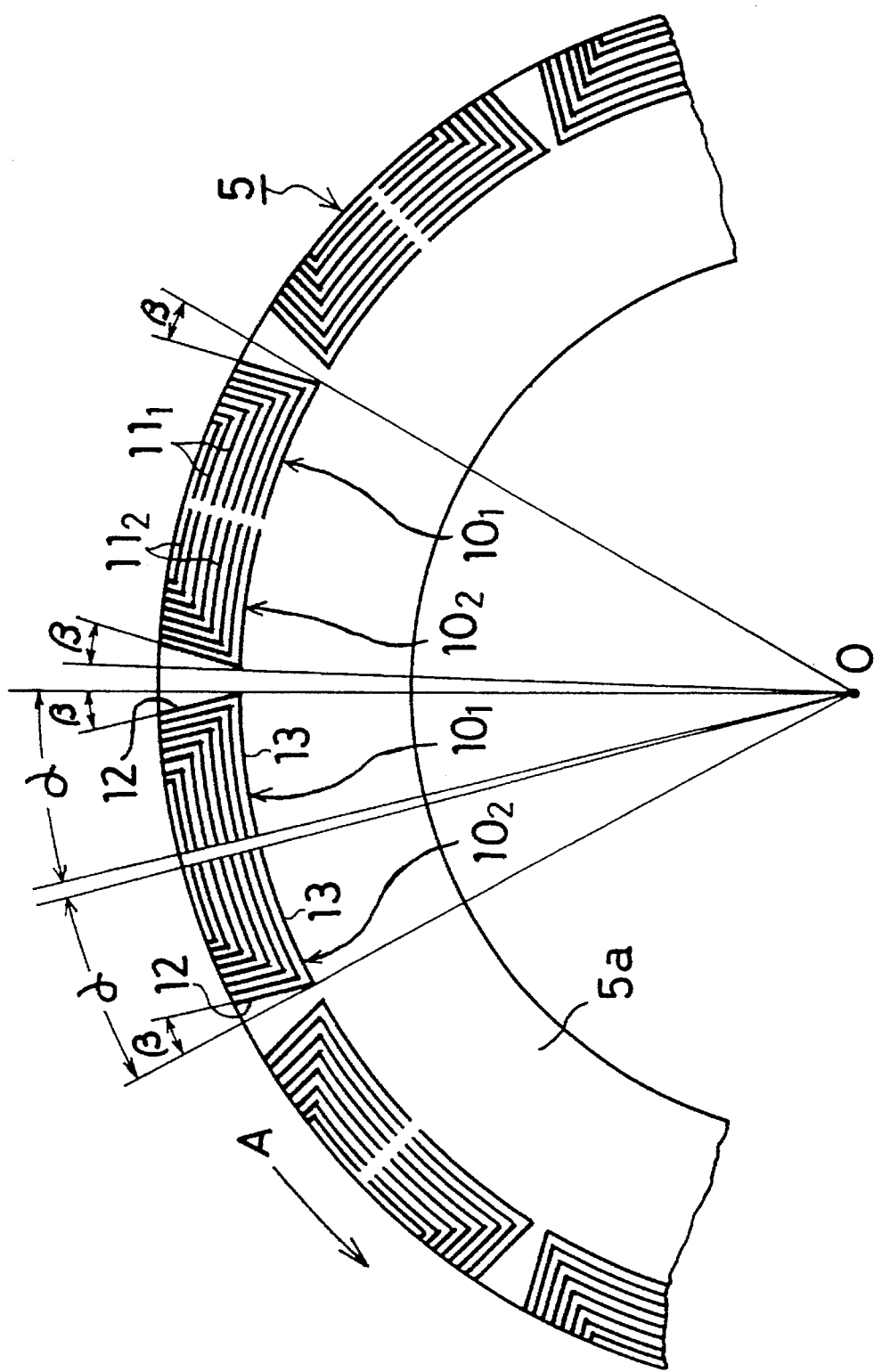
FIG. 4 is a partially cut-away front view of a sealing end face according to a second embodiment.
Figure 5:
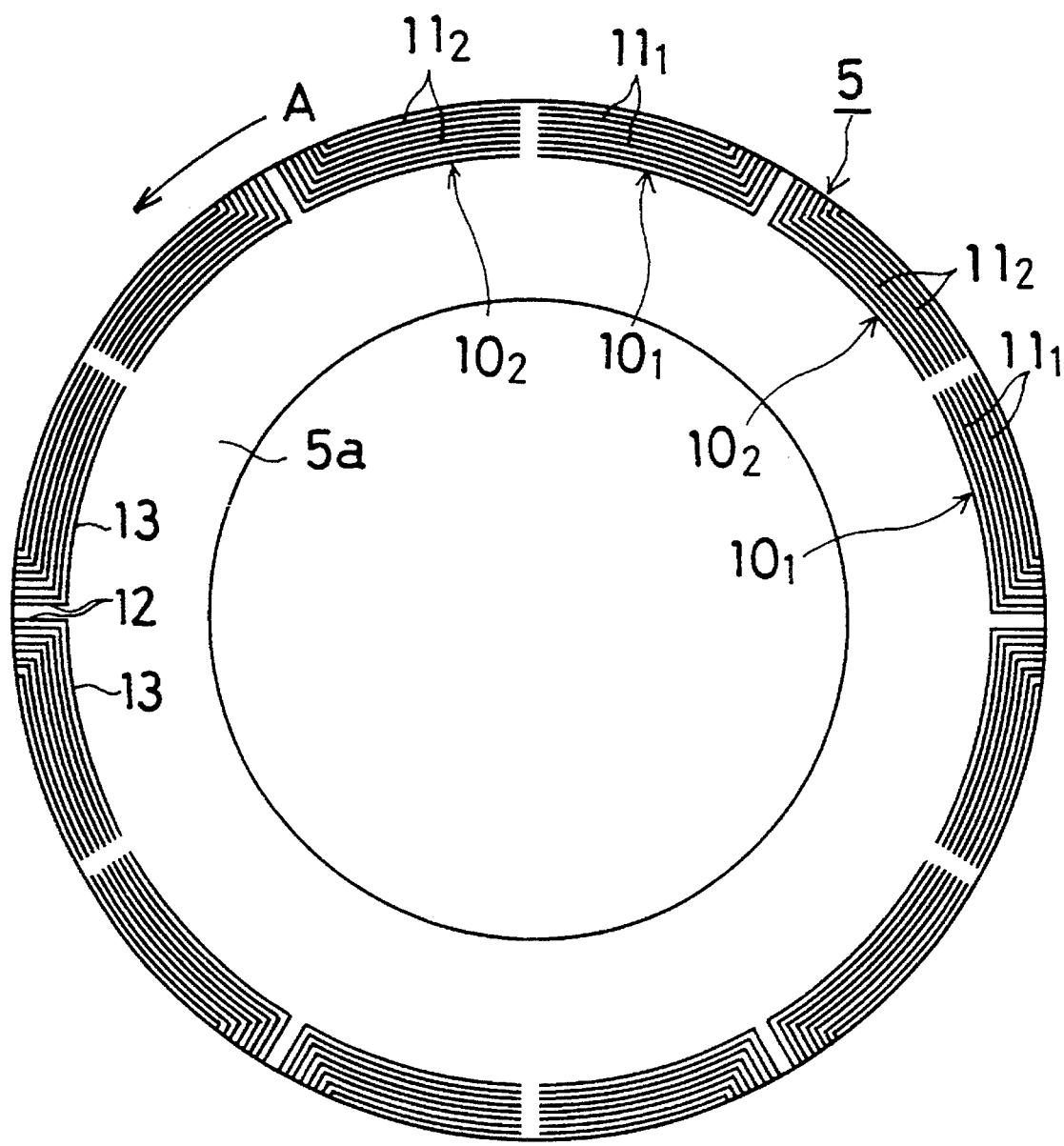
FIG. 5 is a front view of a sealing end face according to a third embodiment.
Figure 6:
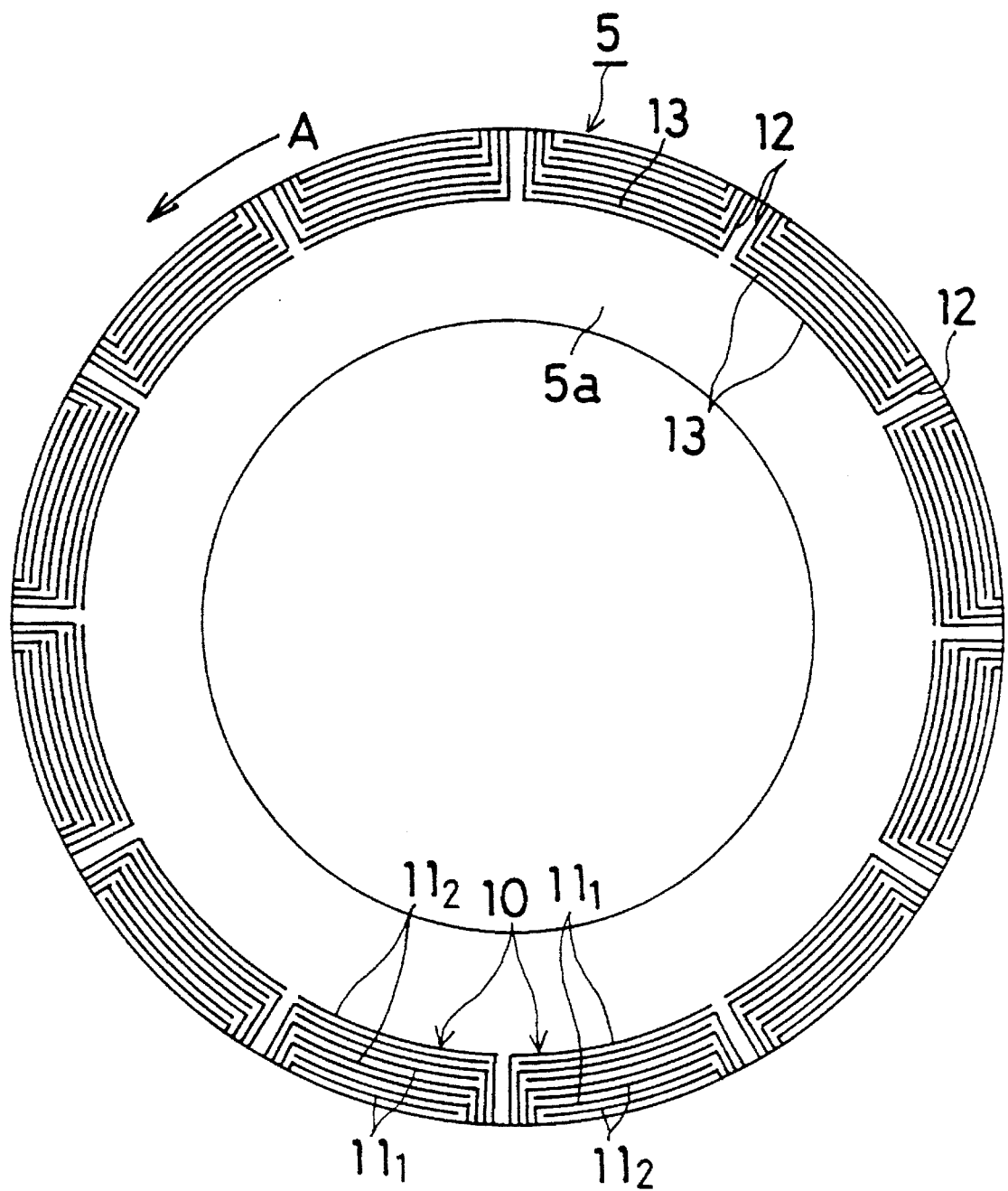
FIG. 6 is a front view of a sealing end face according to a fourth embodiment.
Figure 7:
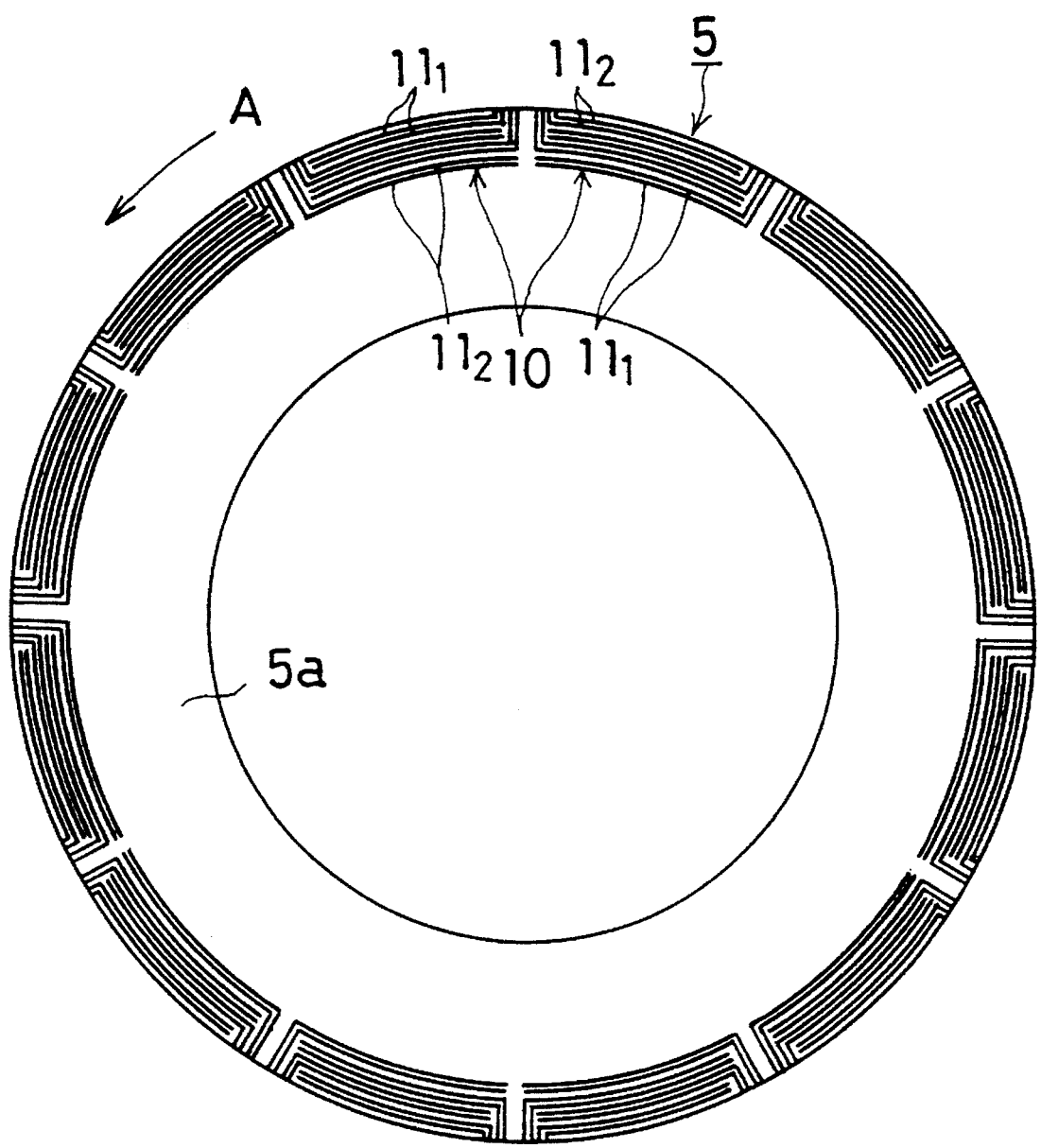
FIG. 7 is a front view of a sealing end face according to a fifth embodiment.
Figure 8:
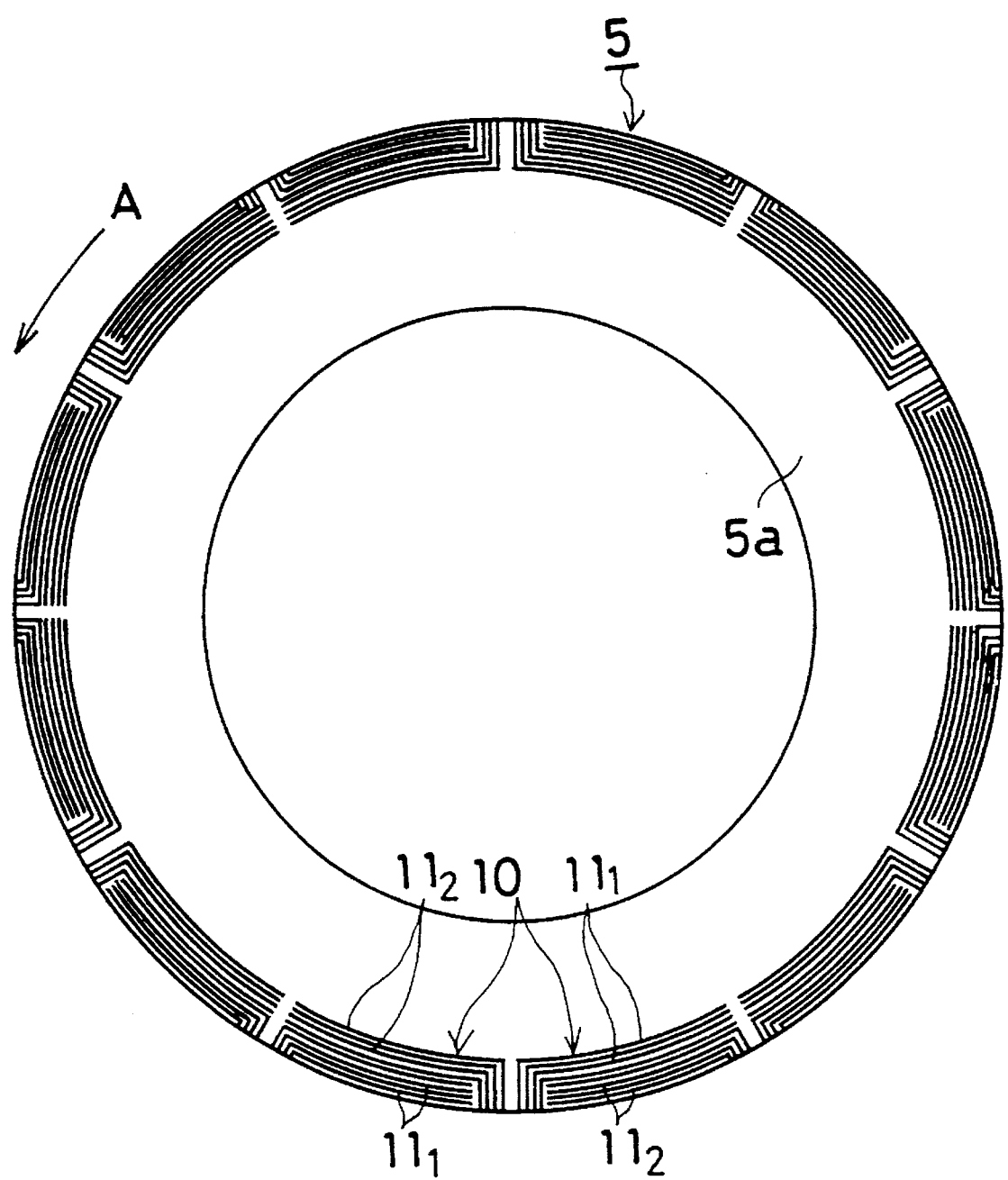
FIG. 8 is a front view of a sealing end face according to a sixth embodiment.
Figure 9:
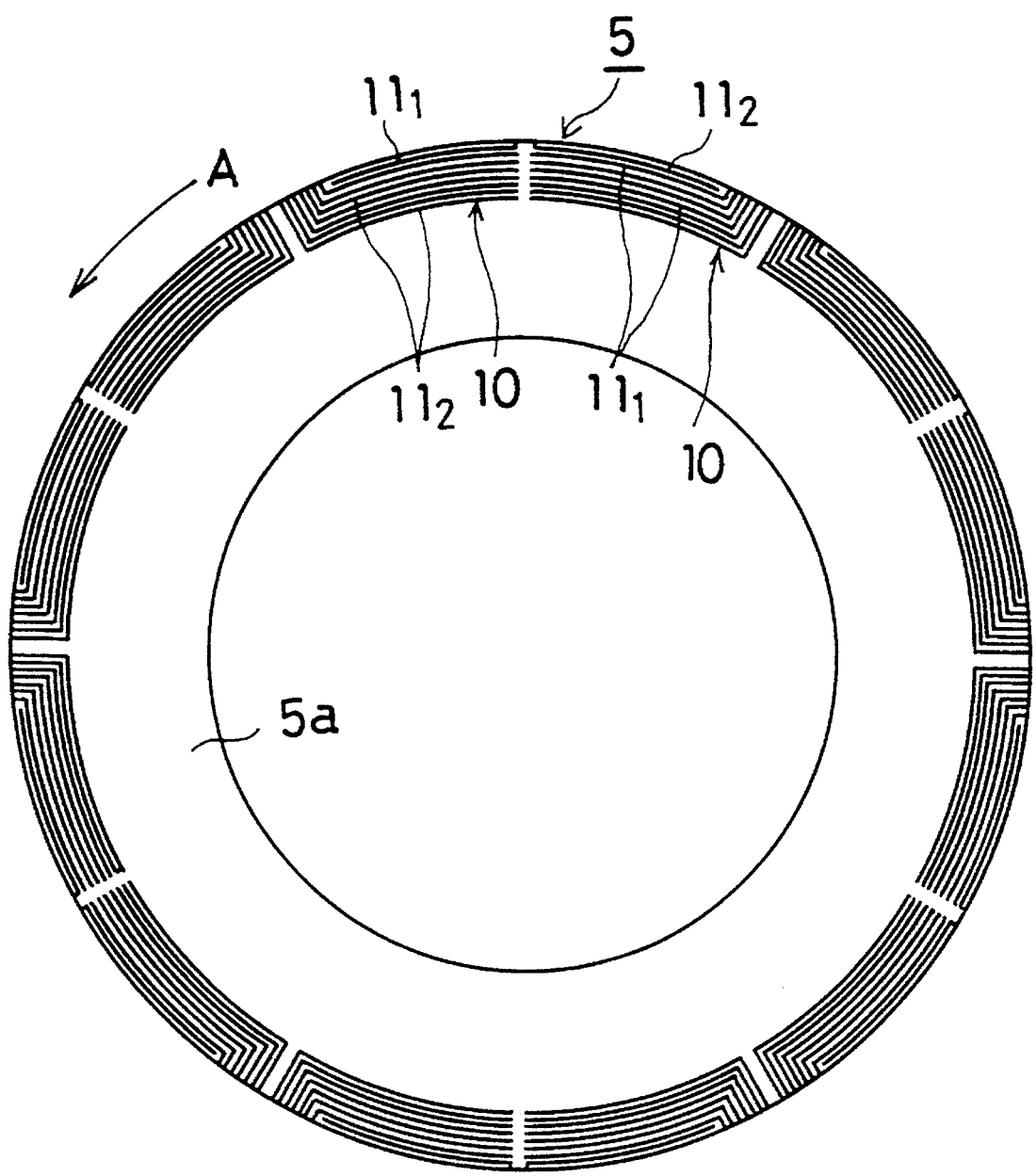
FIG. 9 is a front view of a sealing end face according to a seventh embodiment.
Figure 10:
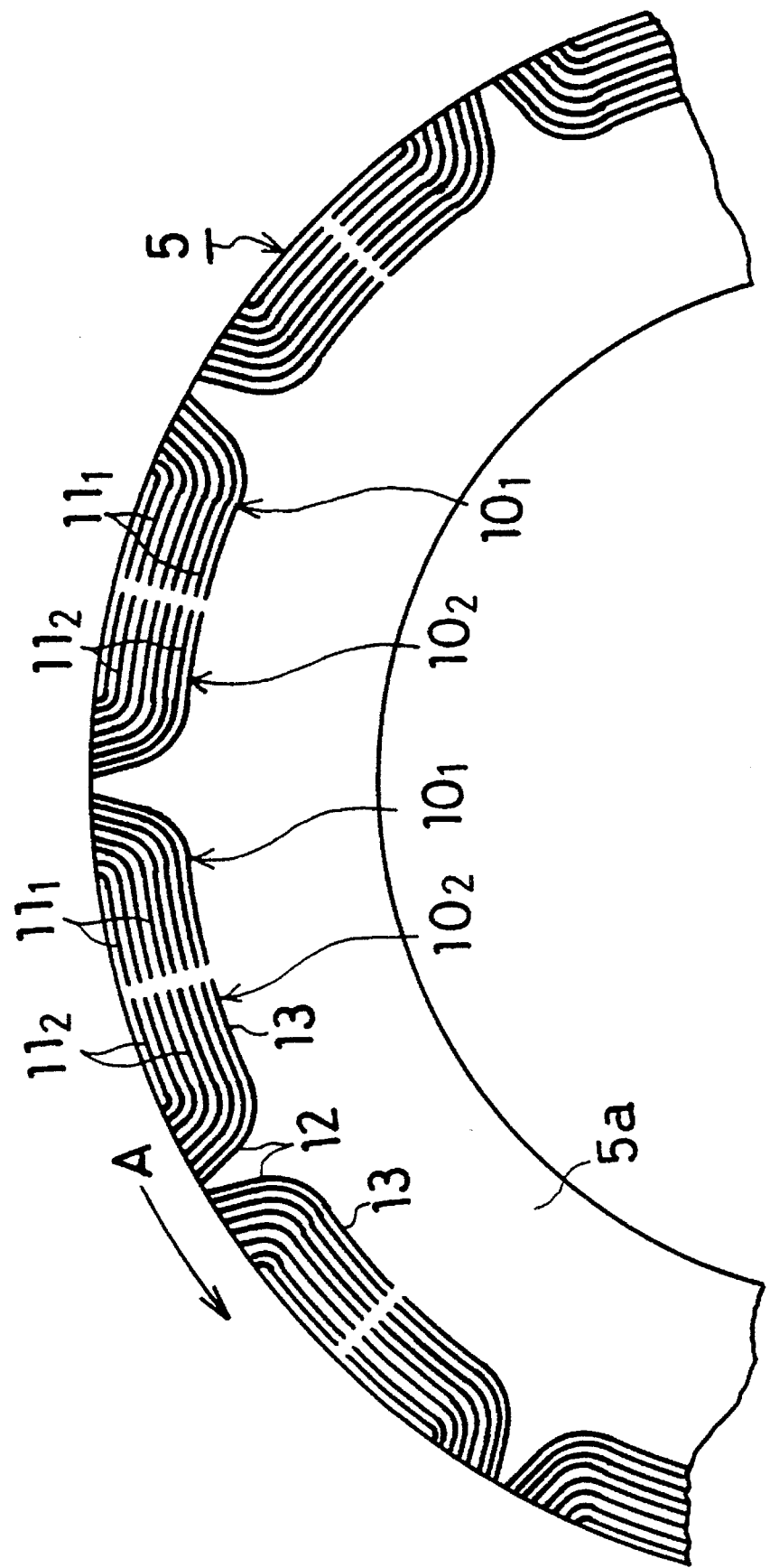
FIG. 10 is a partially cut-away front view of a sealing end face showing a different embodiment.

As shown in FIG. 4, specifically, the inclination direction of each fluid lead-in part 12 with respect to the diametral line is opposite to that of the above mentioned embodiment. In this case, the inclination angle β (45° or less) can also be set freely. In FIG. 5, this inclination angle β is 0°. In FIGS. 6 to 9, in each dynamic pressure generating groove group 10, first dynamic pressure generating grooves $11_1$ possessing dynamic pressure generating parts 13 extending in the forward rotating direction, and second dynamic pressure generating grooves $11_2$ possessing dynamic pressure generating parts 13 extending in the reverse rotating direction, are mixed or interspersed. In FIG. 10, the junction parts of the fluid lead-in part 12 in each dynamic pressure generating groove 11 and the dynamic pressure generating part 13 is in an arc form. In the design of each of these embodiments, the above points (1), (2) and the group ratio must be taken into consideration in the same manner as for the embodiment of FIG. 3.

Figure 11:
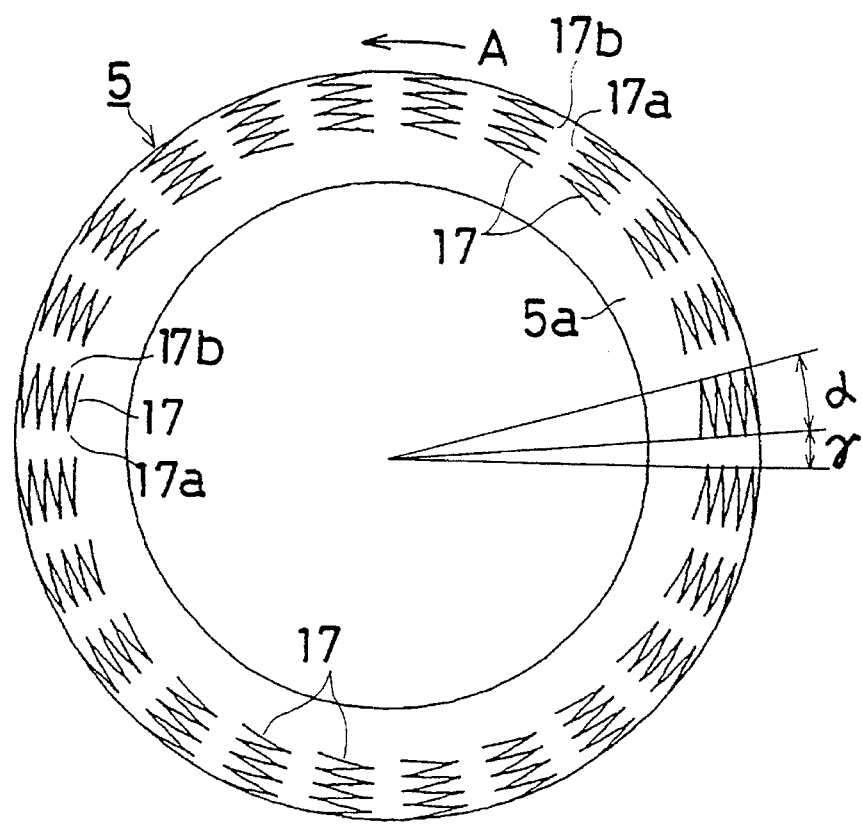
FIG. 11 is a front view of a sealing end face showing a further embodiment.
Figure 12:
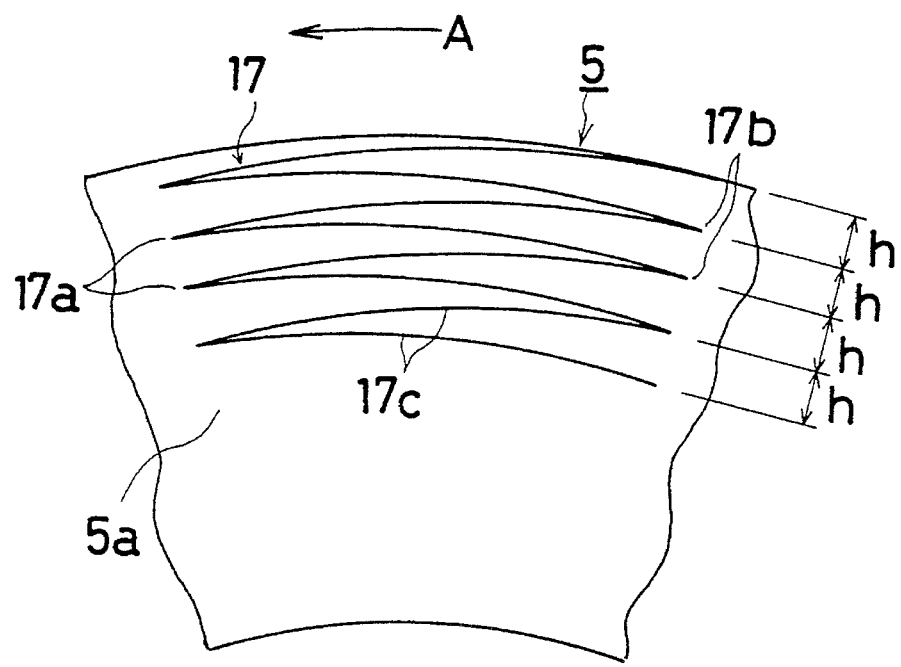
FIG. 12 is a magnified detailed view of part of FIG. 11.

In the embodiments of FIGS. 3–10, each dynamic pressure generating groove 11 is formed to produce one dynamic pressure generating position, but each dynamic pressure generating groove may be formed to produce plural dynamic pressure generating positions. For example, in FIG. 11 the sealing end face surface 5a of the rotary sealing ring 5, is provided with plural dynamic pressure generating grooves 17 disposed adjacent to each other in the peripheral direction. Each dynamic pressure generating groove 17 is in a zigzag form possessing two or more turning points 17a, 17b as shown in FIGS. 11 and 12, and extends in the radial direction from the high pressure side outer peripheral edge of the rotary sealing end face 5a along a zigzag path toward the center of the sealing end face. This dynamic pressure generating groove 17 is a shallow linear groove, which is formed by a laser, etching or shot blast process or other method. The groove depth D and groove width W of the dynamic pressure generating groove 17 should be preferably D=1 to 10 μm, and W=2 mm or less, respectively. The turning points 17a, 17b (including the start point and end point of groove 17) are positioned at equal intervals on a straight line passing through the center of the sealing end face 5a. The range α in the peripheral direction for forming each dynamic pressure generating groove 17, the interval γ between the adjacent dynamic pressure generating grooves 17, and the radial interval h between the turning points 17a, 17b are properly set depending on the diameter of the sealing end face 5a and other conditions. In this embodiment, they are set respectively at α=6.5°, y=1°, and h=1 mm. The linear groove portions 17c linking the turning points 17a and 17b (including start point and end point of groove 17) are formed in an arc depending on the diameter of the sealing end face 5a and other conditions as shown in FIG. 12. The number of turning points 17a and 17b are set properly depending on the radial width and other conditions of the sealing end face 5a. The dam ratio is also set properly depending on the sealing conditions and others, but generally it is about 0.2 to 0.5 in high pressure conditions, and about 0.5 to 0.8 in low pressure conditions.

In a non-contacting shaft sealing device according to the embodiment of FIGS. 11 and 12, when the sealing end faces 3a and 5a are relatively rotated, a dynamic pressure (positive pressure) is always generated between the two sealing end faces 3a and 5a by the dynamic pressure generating grooves 17 regardless of the direction of rotation. When the rotary shaft 2 and the sealing end face 5a rotate in the normal or forward direction (direction A), a dynamic pressure is generated at turning points 17a at the rotating direction side in each dynamic pressure generating groove 17. When the sealing end face 5a rotates in the reverse direction, a dynamic pressure is generated at the turning points 17b (and the end point of the groove).

Therefore, whether the rotary shaft 2 is rotated in the forward or reverse direction, a dynamic pressure is generated between the sealing end faces 3a, 5a, and it is balanced with the back pressure acting on the stationary sealing ring 3, that is, the pressure by the high pressure region sealed fluid acting on the back side of the holding ring 4 and the thrusting force by the spring 6, and the two sealing end faces 3a and 5a are held in a non-contacting state by an interposed film of the fluid in the high pressure region. At this fluid film-forming area, the high pressure side sealed fluid region H and low pressure side sealed fluid region L are favorably separated and sealed.

Figure 13:
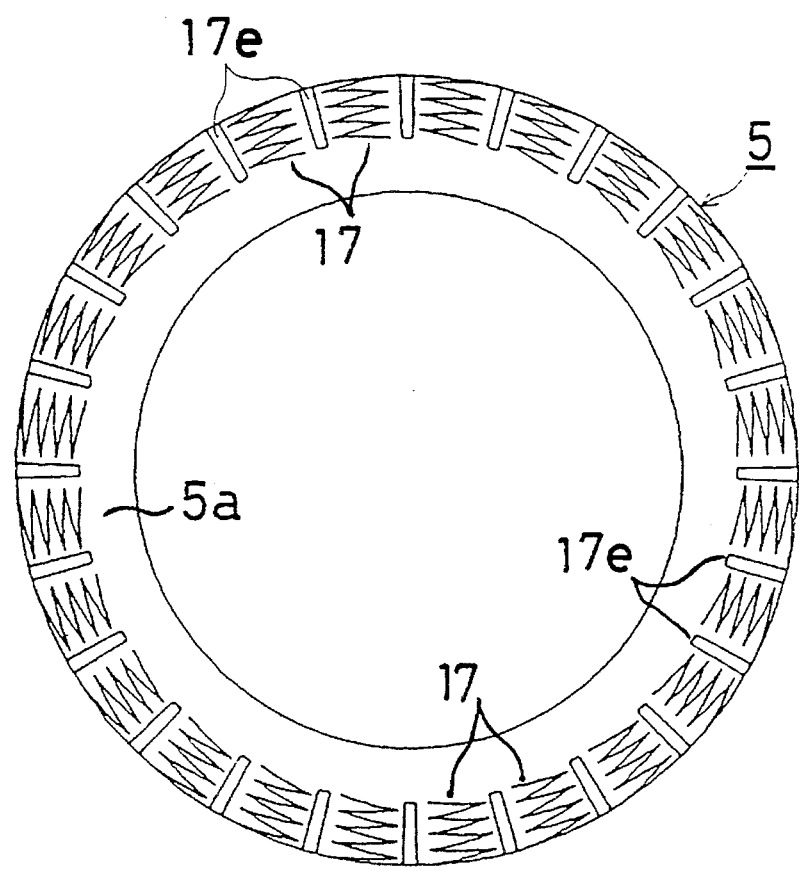
FIG. 13 is a front view of a sealing end face according to yet another embodiment.
Figure 14:
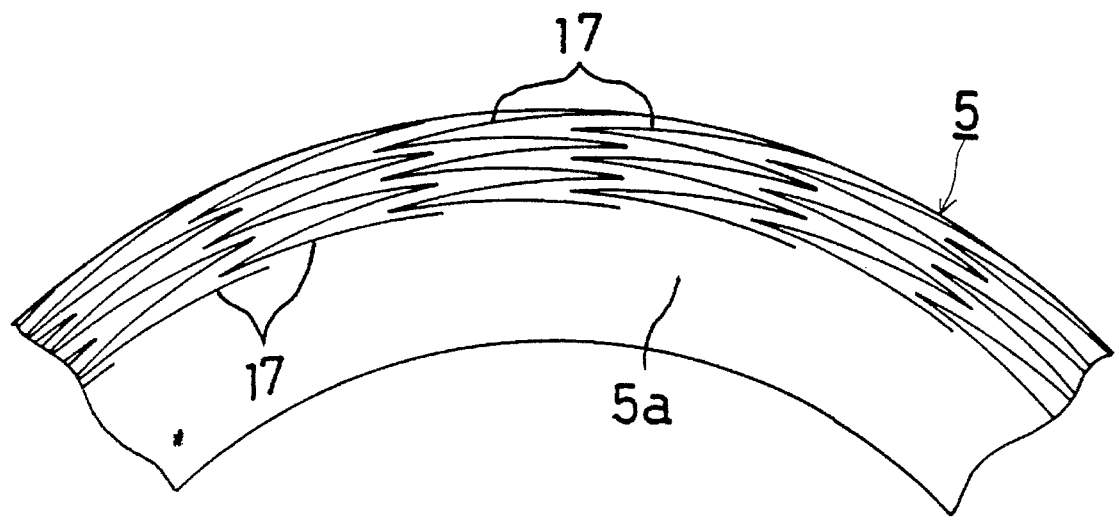
FIG. 14 is a partially cut-away front view of a sealing end face according to another embodiment.
Figure 15:
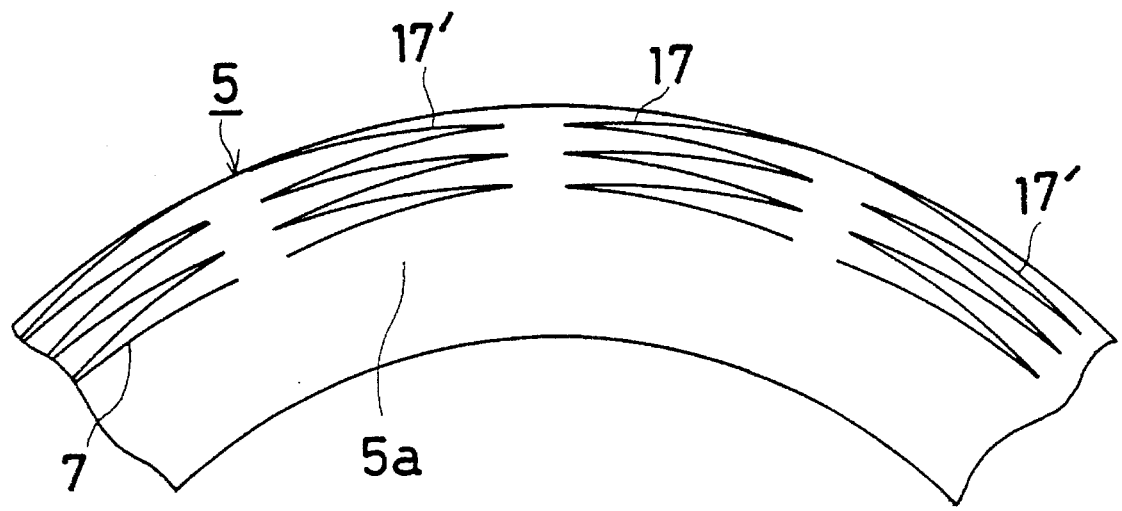
Figure 17:
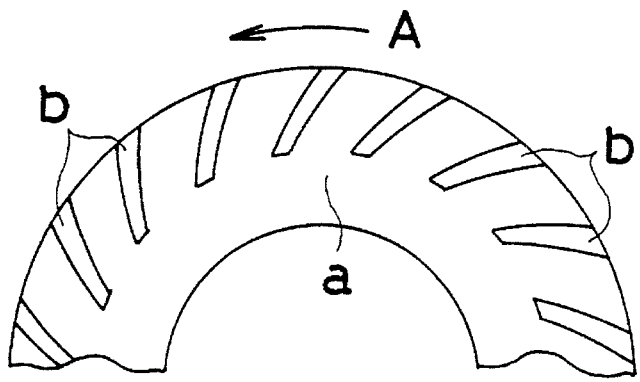
Figure 16:
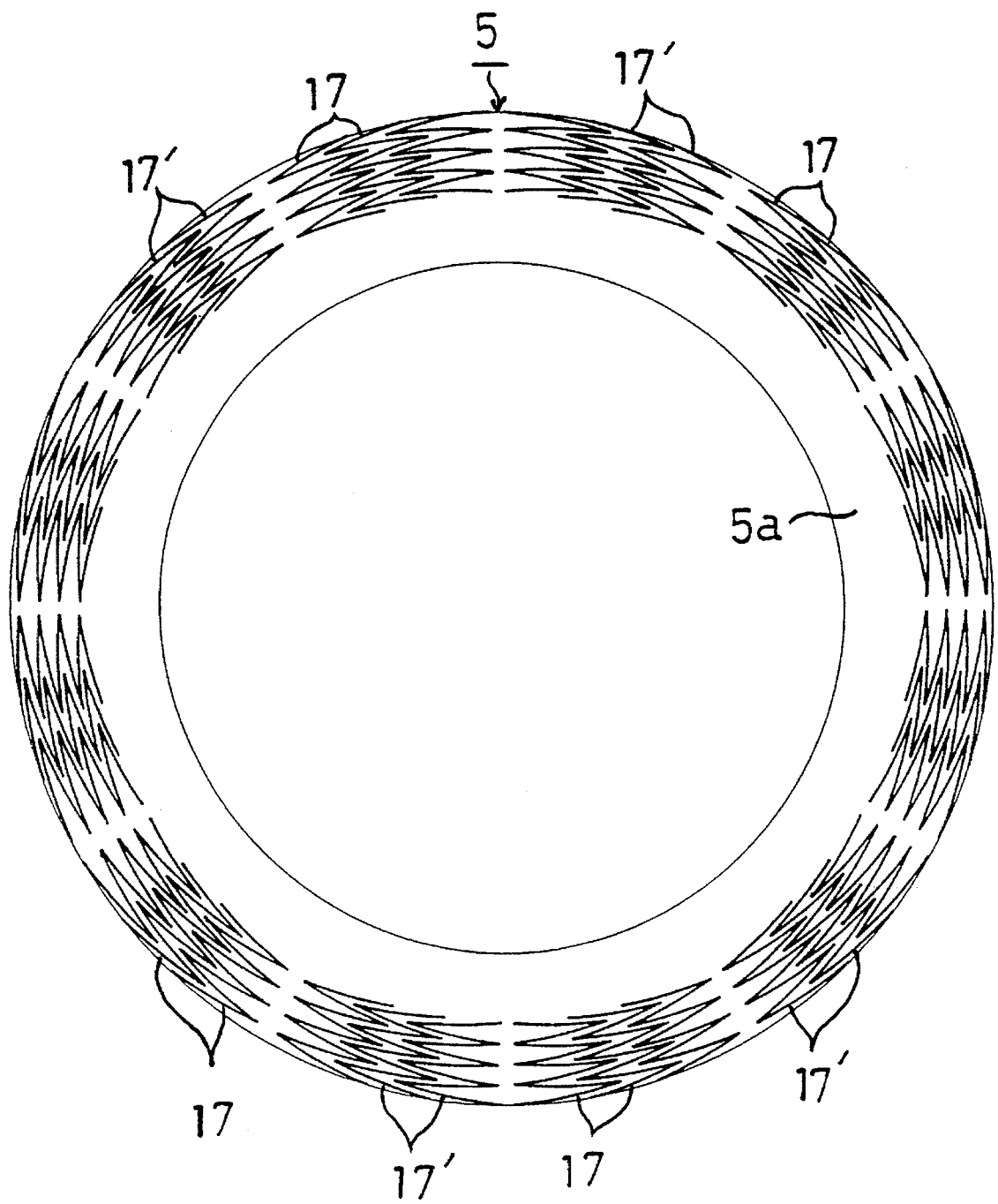

As mentioned above, when forming zigzag dynamic pressure generating grooves 17 on the sealing end face 5a, various forms can be adopted as when forming approximately L-shaped grooves 11. For example, as shown in FIG. 13, a radial groove 17e extending in the direction of the center from the outer peripheral edge of the rotary side sealing end face 5a may be formed between adjacent dynamic pressure generating grooves 17. Alternatively, as shown in FIG. 14, adjacent dynamic pressure generating grooves 17 may be partly overlaid in the peripheral direction. For example, dynamic pressure generating grooves 17 with α=30° are formed and deviated from each other by 15° in the peripheral direction. Or, as shown in FIG. 15, dynamic FIG. 15 is a partially cut-away front view of a sealing end face according to a further embodiment;

FIG. 16 is a partially cut-away front view of a sealing end face according to yet another embodiment; and, FIG. 17 is a partially cut-away front view showing a sealing end face of a conventional non-contacting shaft sealing device.

DETAILED DESCRIPTION OF THE INVENTION

The non-contacting shaft sealing device shown in FIG. 1, comprises a seal case 1 for separating a high pressure fluid region H (for example, the high pressure gas region in a machine such as a turbine) from a low pressure fluid region L (for example, the atmospheric region outside the machine), a rotary shaft 2 penetrating through the seal case 1, a stationary sealing ring 3 slidably held in the seal case 1 by a holding ring 4 so as to be slidable in the direction of the axis of shaft 2, a rotary sealing ring 5 fixed on the rotary shaft 2 opposite to the stationary sealing ring 3, and a spring 6 placed between the seal case 1 and holding ring 4, for pressing and thrusting the stationary seal ring 3 toward the rotary sealing ring 5. In this embodiment, the stationary sealing ring 3 is composed of a soft material such as carbon, and the rotary sealing ring 5 is made of a hard material such as WC, SiC, other ceramics, cemented carbide, and other alloys.

Figure 2:
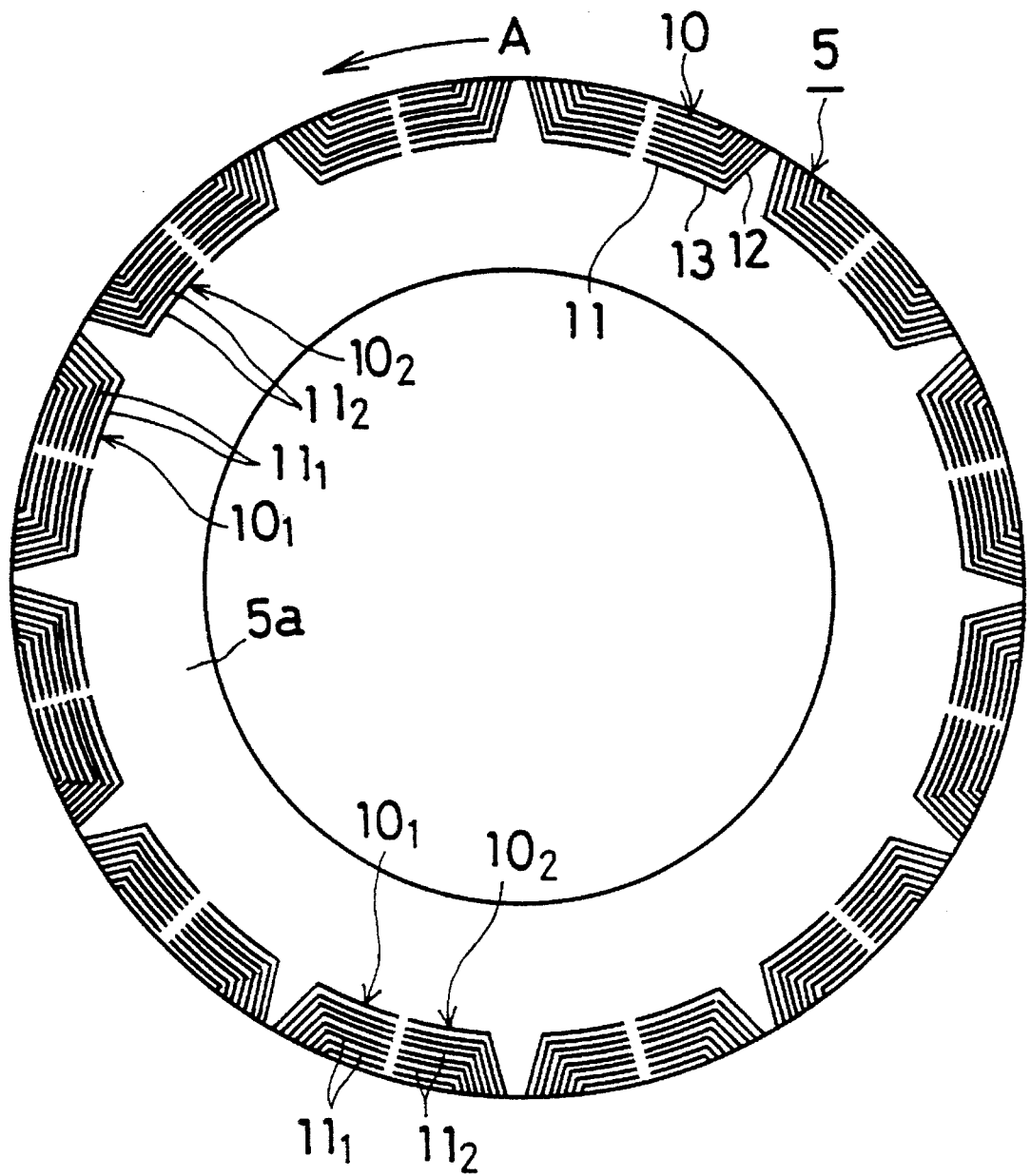
FIG. 2 is a front view showing a sealing end face in which dynamic pressure generating grooves are formed.

As shown in FIG. 2, the rotary sealing ring 5 has a sealing end face 5a in which are formed an even number of dynamic pressure generating groove groups generally designated 10. The groups of grooves are disposed around the periphery of sealing end face 5a and are spaced from each other at a specific short interval in the peripheral direction. As shaft 2 and rotary sealing ring 5 rotate, the grooves generate a dynamic pressure between the sealing end face 5a and the sealing end face 3a of the confronting stationary sealing ring 3.

Each dynamic pressure generating groove group 10 comprises a plurality of approximately L-shaped dynamic pressure generating grooves, generally designated 11. Each groove 11 has a fluid lead-in part 12 and a dynamic pressure generating part 13. The fluid lead-in parts 12 are joined at one end to the dynamic pressure generating parts 13 and extend outwardly to the outer peripheral edge of sealing end face 5a so as to communicate with the high pressure region H. Dynamic pressure generating parts 13 extend in the peripheral direction from the end portions of the fluid lead-in parts 12 and are disposed parallel to one another in the radial direction, without crossing each other. Each fluid lead-in part 12 is linear in shape, and each dynamic pressure generating part 13 is in the shape of an arc having a center of radius coincident with the center 0 of the sealing end face 5a. Each dynamic pressure generating groove 11 is a shallow linear groove formed by a laser, etching or shot blasting processing method, or the like. The depth D and width W of pressure generating groove are preferably D=0.1 to 20 μm, W=0.001 to 3 mm, and preferably the groove depth in the dynamic pressure generating part 13 is 0.1 to 10 μm. The number and width of linear grooves 11 of the dynamic pressure generating groove group 10, especially the number and width of dynamic pressure generating parts 13, are set depending on the sealing conditions and others, but generally they are preferably set such that the groove ratio may be 0.1 to 0.9 (preferably 0.11 to 0.6) where the groove ratio has the value (a/b), a is the radial width of the dynamic pressure generating groove group 10 or the radial width (see FIG. 3) of the region in which the dynamic pressure generating parts 13 are formed parallel to each other in the radial direction, and b is the seal face width or the radial width (see FIG. 1) of the annular face where the sealing end faces 3a and 5a overlap.

As shown in FIG. 3, adjacent dynamic pressure generating groove groups $10_1$ and $10_2$ are disposed symmetrically in the peripheral direction about a diametral line 14 extending in the radial direction through the center 0 of the sealing end face. That is, the range α for forming dynamic pressure generating grooves 11 in each of the dynamic pressure generation groove groups $10_1$, $10_2$, the peripheral interval between fluid lead-in parts 12, and the radial interval between dynamic pressure generating parts 13 are respectively equal between groove groups $10_1$ and $10_2$. A dynamic pressure generating groove group $10_1$ is composed only of first dynamic pressure generating grooves $11_1$ having the dynamic pressure generating part 13 extending from each fluid lead-in part 12 in the peripheral direction corresponding to the normal or forward rotation direction indicated by arrow A, whereas the dynamic pressure generating groove groups $10_2$ comprise second dynamic pressure generating grooves $11_2$ having the dynamic pressure generating parts 13 extending from each fluid lead-in part 12 in the opposite or reverse direction of rotation. The fluid lead-in part 12 in each first dynamic pressure generating groove $11_1$ is inclined at a specific angle β in the normal rotating direction with respect to a diametral line extending through the center 0 of the sealing end face, whereas the fluid lead-in part 12 in each second dynamic pressure generating groove $11_2$ is inclined at the same specific angle β in the reverse rotating direction with respect to a diametral line.

To exhibit the dynamic pressure generating function sufficiently, it is necessary at least (1) to provide as many dynamic pressure generating grooves 11 as possible, and (2) to design the dynamic pressure generating part 13 of sufficient length so as to have a necessary approaching distance for generating dynamic pressure. Therefore, the form of the dynamic pressure generating groove groups 10 should be properly set depending on the diameter, sealing condition of the sealing end face 5a and others, taking into consideration points (1) and (2) and the groove ratio. For example, the peripheral interval between the fluid lead-in parts 12 and the radial interval between the dynamic pressure generating parts 13 should be preferably set as small as possible in consideration of point (1). According to this embodiment, the interval is set at about the groove width W. The inclination angle β of each fluid lead-in part 12 should preferably be generally 0° to 45° because if β>45°, the fluid lead-in part 12 becomes long sequentially with the result that either (1) or (2) must be sacrificed. This may lead to a decrease in the generated dynamic pressure. In this embodiment, β is set at 15°. Also, the range α in the peripheral direction for forming the dynamic pressure generating groove group 10 is also set appropriately in consideration of points (1), (2), and generally α is preferably set at 5° to 30°, and α=13° in this embodiment.

In the thus composed shaft sealing device, when the rotary shaft 2 is rotated in the normal direction, dynamic pressure is generated in the terminal end portion of each dynamic pressure generating part 13 in the first dynamic pressure generating grooves $11_1$ by the high pressure side sealed fluid introduced into the first dynamic pressure generating grooves $11_1$, and when the rotary shaft 2 is rotated reversely, dynamic pressure is generated in the terminal end portion of each dynamic pressure generating part 13 in the second pressure generating grooves 17 and 17' may be symmetrical around a diametral line extending through the center of the sealing end face 5a and may be disposed alternately in the peripheral direction. Furthermore, and as shown in FIG. 16, first and second dynamic pressure generating groove groups 17 and 17', symmetrical around the diametral line of the sealing end face 5a, may be alternately disposed in the peripheral direction. In this case, each dynamic pressure generating groove group 17 or 17' is formed with the dynamic pressure generating grooves of an adjacent group 17 and 17 or 17' being partially overlaid in the peripheral direction as in the embodiment shown in FIG. 14. When constituted as shown in FIG. 15 or 16, whether rotating forwardly or reversely, the characteristics of the dynamic pressure generation by the dynamic pressure generating groove groups 17 and 17' are identical, and forward and reverse rotations are carried out in exactly the same conditions.

Also, in the case shown in FIG. 15 or FIG. 16, like the one shown in FIG. 13, radial grooves 17e may be formed between adjacent dynamic pressure generating grooves 17 and 17' or between dynamic pressure generating groove groups 17 and 17'. Furthermore, in the cases shown in FIGS. 3 through 10, radial grooves 17e may be formed between adjacent dynamic pressure generating groove groups $10_1$ and $10_2$.

In the foregoing embodiments, since the outside of the annular region where the two sealing end faces 3a, 5a are overlapped is at high pressure, the start end portions of the dynamic pressure generating grooves $11_1$, $11_2$, 17 and 17' are located in the outer peripheral edge of the sealing end face 5a, but when the inside of the annular region is at high pressure, that is, when the region L in FIG. 1 is the high pressure region while region H is the low pressure region, the above mentioned start end portions are located in the inner peripheral edge of the sealing end face surface 5a. More specifically, the fluid lead-in parts 12 of approximately L-shaped dynamic pressure generating grooves $11_1$ and $11_2$, or the zigzag dynamic pressure generating grooves 17 and 17', are formed so as to extend toward the outer peripheral side from the inner peripheral edge of the sealing end face 5a. Of course, when forming the radial grooves 17e, these radial grooves 17e are formed so as to extend toward the outer peripheral side from the inner peripheral edge of the sealing end face 5a.

The dynamic pressure generating grooves $11_1$, $11_2$, 17 and 17' can be formed in the stationary side or case sealing ring end face 3a. However, when the sealing rings 3 and 5 are composed of soft materials such as carbon and hard materials such as WC, SiC, other ceramics, cemented carbide or other alloys, the grooves are preferably made of hard material.

We claim:

1. A non-contacting shaft sealing device wherein a sealing end face of a case seal and a sealing end face of a rotary shaft seal rotate relatively in a non-contacting state with a film of fluid from a high pressure region being sealed interposed therebetween, and sealing end face having an even number of dynamic pressure generating groove groups disposed in the peripheral direction relative to each other said on said one sealing end face, each dynamic pressure generating groove group having plural independent and approximately L-shaped linear dynamic pressure generating grooves each composed of a fluid lead-in part extending in a radial direction on said one sealing end face to a peripheral edge of said one sealing end face so as to communicate with said high pressure region, and a dynamic pressure generating part extending in the peripheral direction of said one sealing end face from an end portion of a respective fluid lead-in part, said dynamic pressure generating grooves not crossing each other and, within each group, being disposed adjacent one another in the radial direction of said one sealing end face, any two adjacent dynamic pressure generating groove groups being symmetrically disposed in the peripheral direction about a diametral center line of said one sealing end face extending between said any two adjacent dynamic pressure generating groove groups, said dynamic pressure generating grooves having a width between 0.001 and 2.0 mm, and said one sealing end face having a groove ratio of 0.1 to 0.9 where the groove ratio is defined as the ratio of the radial width of a dynamic pressure generating groove group to the radial width of an annular face where said sealing end faces overlap.

2. A non-contacting shaft sealing device according to claim 1, wherein each dynamic pressure generating groove comprises a shallow linear groove formed by one process of the group of processes consisting of laser processing, etching processing, and shot blast processing.

3. (Amended) A non-contacting shaft sealing device according to claim 1, wherein the groove depth of each dynamic pressure generating groove is 0.1 to 20 μm.

4. A non-contacting shaft sealing device according to claim 1, wherein said fluid lead-in parts are linear and disposed on said one sealing end face so as to extend in the radial direction of said one sealing end face, and said dynamic pressure generating parts are in the shape of an arc having a center of radius coinciding with the center of said one sealing end face, the dynamic pressure generating parts in a groove group being disposed in the radial direction relative to each other.

5. A non-contacting shaft sealing device according to claim 4 wherein, in each dynamic pressure generating groove group, each fluid lead-in part is included at a specific inclination angle β with respect to a diametral line of the sealing end face.

6. A non-contacting shaft sealing device according to claim 5 wherein, said inclination angle β is from 0° to 45°.

7. A non-contacting shaft sealing device according to claim 6 wherein, in each dynamic pressure generating groove group, the inclination direction of each fluid lead-in part is the same as the direction in which a dynamic pressure generating groove extends from the end portion of its respective fluid lead-in part.

8. A non-contacting shaft sealing device according to claim 6 wherein, in each dynamic pressure generating groove group, the inclination direction of each fluid lead-part is reverse to the direction in which a dynamic pressure generating groove extends from the end portion of its respective fluid lead-in part.

9. A non-contacting shaft sealing device according to claim 1, wherein a range α in the peripheral direction of said one sealing end face for forming said dynamic pressure generating groove group is a range of 5° to 30° with respect to the center of said one sealing end face.

10. A non-contacting shaft sealing device according to claim 1 wherein, in each dynamic pressure generating groove group, said dynamic pressure generating parts of all said dynamic pressure generating grooves extend in the same direction from said fluid lead-in parts.

11. A non-contacting shaft sealing device according to claim 1, wherein the dynamic pressure generating groove groups comprise a first type wherein said dynamic pressure generating grooves have said dynamic pressure generating parts extending from said fluid lead-in parts in the normal rotating direction of the rotary shaft, and a second type wherein said dynamic pressure generating grooves have said dynamic pressure generating parts extending from said fluid lead-in parts in the direction reverse to the rotating direction of the rotary shaft.

12. A non-contacting shaft sealing device wherein a sealing end face of a case seal and a sealing end face of a rotary shaft seal rotate relatively in a non-contacting state with a film of fluid from a high pressure region being sealed interposed therebetween, one said sealing end face having plural dynamic pressure generating grooves formed therein, said dynamic pressure generating grooves being disposed relative to each other in the peripheral direction of said one sealing end face, each dynamic pressure generating groove being a shallow linear groove in a zigzag form possessing two or more turning points and extending in the radial direction of said one sealing end face to a peripheral edge of said one sealing end face so as to communicate with said high pressure region.

13. A non-contacting shaft sealing device according to claim 12, wherein said one sealing end face includes radial grooves extending in said radial direction from said peripheral edge, said radial grooves being disposed between adjacent dynamic pressure generating grooves.

14. A non-contacting shaft sealing device wherein a sealing end face of a case seal and a sealing end face of a rotary shaft seal rotate relatively in a non-contacting state with a film of fluid from a high pressure region being sealed interposed therebetween, one said sealing end face having plural dynamic pressure generating grooves formed therein, said dynamic pressure generating grooves being disposed relative to each other in the peripheral direction of said one sealing end face, each dynamic pressure generating groove being a shallow linear groove in a zigzag form possessing two or more turning points and extending in the radial direction of said one sealing end face to a peripheral edge of said one sealing end face, adjacent ones of said dynamic pressure generating grooves being partly overlaid in the peripheral direction without crossing each other.

15. A non-contacting shaft sealing device according to claim 12, wherein adjacent ones of said dynamic pressure generating grooves are symmetrical around a diametral line of said one sealing end face.

16. A non-contacting shaft sealing device wherein a sealing end face of a case seal and a sealing end face of a rotary shaft seal rotate relatively in a non-contacting state with a film of fluid from a high pressure region being sealed interposed therebetween, one said sealing end face having plural dynamic pressure generating grooves formed therein, said dynamic pressure generating grooves being disposed relative to each other in the peripheral direction of said one sealing end face, each dynamic pressure generating groove being a shallow linear groove in a zigzag form possessing two or more turning points and extending in the radial direction of said one sealing end face to a peripheral edge of said one sealing end face, said dynamic pressure generating grooves being disposed in dynamic pressure generating groove groups each consisting of plural dynamic pressure generating grooves said groups being disposed relative to each other in the peripheral direction of said one sealing end face, adjacent dynamic pressure generating grooves in each said dynamic pressure generating groove group being partly overlaid in said peripheral direction without crossing each other, and adjacent dynamic pressure generating groove groups being symmetrical around a diametral line of said one sealing end face.

17. A non-contacting shaft sealing device comprising a seal having a sealing end face with an even number of groups of dynamic pressure generating grooves therein, each group of grooves comprising a plurality of lead-in parts and a plurality of dynamic pressure generating parts, each of the lead-in parts extending generally radially on said sealing end face from a peripheral edge of said sealing end face, each of said dynamic pressure generating parts being joined at one end to a respective one of said fluid lead-in parts whereby one lead-in part and one dynamic pressure generating part form one dynamic pressure generating groove, the dynamic pressure generating parts in each group being displaced from each other in the radial direction on said sealing end face, said dynamic pressure generating parts extending from said fluid lead-in parts in the peripheral direction of said sealing end face, said groups of grooves comprising a first type wherein the dynamic pressure generating parts extend peripherally from the lead-in parts in a first direction and a second type wherein the dynamic pressure generating parts extend from the fluid lead-in parts in a second direction opposite to said first direction, said groups of grooves of said first type being alternately disposed with said groups of grooves of said second type in the peripheral direction of said sealing end face, adjacent groups of dynamic pressure generating grooves being symmetrically disposed about a diametral line of said sealing end face extending between the adjacent groups.

* * * * *